United States Patent [19]

Lapp et al.

[11] 4,110,496
[45] Aug. 29, 1978

[54] DIELECTRIC SYSTEM FOR AN ELECTRICAL APPARATUS

[75] Inventors: John Lapp, Franklin; Fred S. Sadler, Racine, both of Wis.

[73] Assignee: McGraw-Edison Company, Milwaukee, Wis.

[21] Appl. No.: 735,020

[22] Filed: Oct. 22, 1976

Related U.S. Application Data

[62] Division of Ser. No. 494,767, Aug. 5, 1974, Pat. No. 3,996,505.

[51] Int. Cl.² .............................................. B32B 27/08
[52] U.S. Cl. ................... 428/500; 174/25 C; 252/63.7; 361/318; 361/319; 428/286; 428/517
[58] Field of Search ............. 252/63, 63.7, 65; 428/286, 517, 500; 174/25 C; 361/304, 314, 315, 317, 318, 319

[56] References Cited

U.S. PATENT DOCUMENTS

| Re. 27,823 | 11/1973 | Cox | 252/65 |
|---|---|---|---|
| 2,082,525 | 6/1937 | Sloan | 252/63 X |
| 2,566,196 | 8/1951 | Hardy | 252/63.7 |
| 3,430,116 | 2/1969 | Johstone | 361/314 |
| 3,748,372 | 7/1973 | McMahon | 174/25 C X |
| 3,772,578 | 11/1973 | George | 361/304 |

OTHER PUBLICATIONS

Cheng, "Effect of Impregnant on the Electrical & Mechanical Prop. of Polyp. Paper in Wire & Wire Products", May 1972, pp. 57, 58, 60, 61, 62 & 63.
The Merck Index Eighth Edition, Merck & Co., 1968, (cyclohexylamine).
Pilpel, "Four Synthetic Insulations, Properties & Potentials", in Insulation, May 1968, pp. 63-69.

*Primary Examiner*—E. A. Goldberg
*Attorney, Agent, or Firm*—Andrus, Sceales, Starke & Sawall

[57] ABSTRACT

An improved dielectric system for an electrical apparatus. The dielectric system includes a polymeric film impregnated with low molecular weight polybutene having an average number molecular weight in the range of 300 to 500. The dielectric system has improved dielectrical properties and the polybutene is biodegradable which minimizes the pollution of the atmosphere if the dielectric liquid is exposed to the atmosphere. Further extended service life can be achieved by the addition of a cyclohexyl amine to the liquid dielectric.

2 Claims, 2 Drawing Figures

DIELECTRIC SYSTEM FOR AN ELECTRICAL APPARATUS

This is a division of application Ser. No. 494,767, filed Aug. 5, 1974 U.S. Pat. No. 3,996,505 issued Dec. 7, 1976.

BACKGROUND OF THE INVENTION

Liquid dielectric compositions are used in various types of electrical apparatus, such as capacitors, condensor bushings, transformers, cables and the like. In the construction of capacitors, such as power factor correction capacitors, capacitor packs are formed of alternate layers of metal foil and a dielectric material which is impregnated with the liquid dielectric. It is desirable that the liquid dielectric have a high dielectric constant, maintain a low dissipation factor and be compatible with other materials in the capacitor structure. Furthermore, the liquid dielectric must be capable of withstanding elevated and fluctuating temperature, pressure and voltage stress conditions over the entire operational life of the capacitor.

In the past, various types of liquid dielectrics have been used in capacitors such as polychlorinated diphenyl, castor oil, mineral oil, silicone oil, and the like. Of the commonly used liquid dielectrics, polychlorinated diphenyl, such as trichlorodiphenyl, has been the most widely used in capacitor applications.

While the polychlorinated diphenyls produced an effective electrical dielectric system for a capacitor, their usage has provided certain ecological problems in that the polychlorinated diphenyls are virtually non-biodegradable with the result that if leakage or rupture occurs in the capacitor casing, or if the capacitor is discarded as obsolete, the polychlorinated diphenyl will remain as a pollutant in the environment and will not degrade to any appreciable extent even over extended periods of time.

Because of the ecological problems there has been increased activity in an attempt to develop a replacement for the polychlorinated diphenyls as a capacitor impregnant. Any substitute impregnant should be biodegradable and have dielectric properties and performance characteristics comparable to those of the polychlorinated diphenyl.

While higher molecular weight polybutene, having a molecular weight of over 80° has had some limited use in the past as a liquid dielectric in electrical cables, polybutene has not been used in high stress electrical capacitors for use in power factor correction applications for several reasons. First, the relative dielectric constant of polybutene is about 2.10 to 2.25 compared to about 5.9 for trichlorodiphenyl. In a capacitor using all paper, or a combination of paper and polyolefin film, as the solid dielectric material, a substantial amount of capacitance is lost due to the lower relative dielectric constant of the polybutene.

Secondly, polybutene tends to generate gas under conditions of aging at temperatures above room temperature and the development of gas tends to shorten the life of the capacitor by giving rise to corona discharges. It is also believed that the polybutene depolymerizes under high electrical stress, which can give rise to corona discharges and early dielectric failure. However, higher molecular weight polybutene has found use in the past in the manufacture of cables, due to the fact that with cables it is desirable to have low capacitance, and the stresses on the system are considerably lower.

SUMMARY OF THE INVENTION

The invention relates to an improved dielectric system for an electrical apparatus, such as a capacitor. The dielectric system is formed of a polymeric film, such as polypropylene or polyethylene, which is impregnated with low molecular polybutene having an average number molecular weight of 300 to 500.

With the use of the low molecular weight polybutene, the rate of impregnation of the polymeric film is increased over conventional systems, with the result that the processing time for fabrication of the capacitor is substantially reduced.

As a further advantage, the dielectric system utilizing the polymeric film and the polybutene results in extremely low dielectric losses. For example, the losses are about one-fourth of the losses of a paper-film capacitor impregnated with trichlorodiphenyl.

As the polybutene is generally biodegradable it will decompose into harmless compounds when exposed to the atmosphere through leakage or rupture of the capacitor casing and there are no determined adverse effects on the environment.

The invention also offers a lower cost product in that the cost of polybutene is substantially less than that of the polychlorinated diphenyls presently used in the art.

Further improvement in the stability of the dielectric system can be achieved by the addition of 0.1 to 10% by weight of a cyclohexylamine, such as dicyclohexylamine, to the polybutene. The cyclohexylamine acts as a neutralizing agent or scavenger, serving to neutralize decomposition products that are released from, or generated by, the liquid dielectric or other materials in the capacitor during its operation, thereby providing a substantially longer service life.

A further increase in the rate of impregnation can be achieved by the addition of trichlorobenzene to the liquid dielectric composition in an amount up to 20% by weight of the composition. The trichlorobenzene acts to lower the viscosity of the liquid dielectric, as well as its pour point, and thereby further improve the impregnation characteristics.

In addition, anti-oxidants, such as butylated hydroxy toluene, or di-tert-butyl-p-cresol can be incorporated in the liquid dielectric composition in an amount up to 15% by weight and serve to improve the corona extinction characteristics of the dielectric system.

Other objects and advantages will appear in the course of the following description.

DESCRIPTION OF THE DRAWINGS

The drawings illustrate the best mode presently contemplated of carrying out the invention.

In the drawings.

DESCRIPTION OF THE PREFERRED EMBODIMENT

Figure 1:
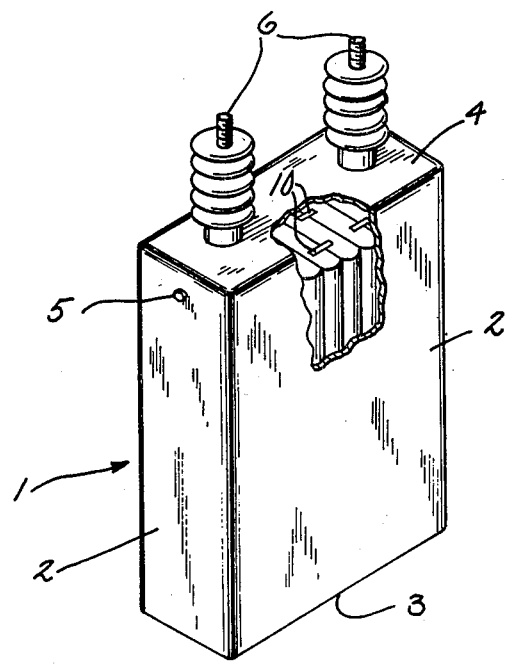
FIG. 1 is a perspective view of a typical capacitor incorporating the dielectric composition of the invention.

FIG. 1 illustrates a typical capacitor comprising an outer casing 1 composed of side walls 2, a bottom wall 3 and a cover 4. In service the casing is hermetically sealed and is provided with a small seal hole 5 through which the dielectric liquid is introduced into the casing during fabrication. In addition, a vacuum line can be connected to the hole 5 for vacuum drying of the capacitor during fabrication. A pair of terminals 6 project through the cover and are insulated from the cover.

Figure 2:
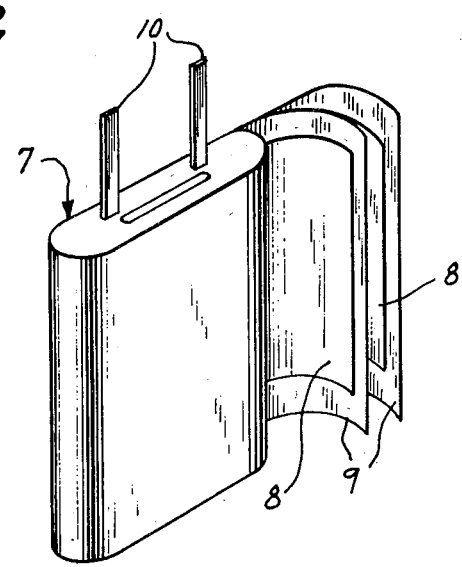
FIG. 2 is a perspective view of a capacitor pack.

A series of capacitor packs 7 are disposed within the casing and each capacitor pack, as illustrated in FIG. 2, includes wound layers of metal foil 8, separated by dielectric layer 9. Electrodes 10 are connected to the foil layers 8 and the electrodes of the various packs are connected together in series for final connection to the terminals 6.

Foil layers 8 may be formed of any desired electrically conductive material, generally a metallic material, such as aluminum, copper, and the like. The layers 8 may be in the form of flat sheets, or the layers can be provided with a series of surface deformations formed by indentations on one side of the foil and corresponding elevations on the other side, as disclosed in U.S. Pat. No. 3,746,953.

The dielectric layers 9 are formed of sheets of polymeric film, such as polypropylene, polyethylene, polyester, or polycarbonate. In addition the dielectric layers may take the form of thin polymeric strips, such as polypropylene, having a layer of fine polymeric fibers adhering to one or both surfaces of the strip, as disclosed in U.S. Pat. No. 3,772,578. The term "all film" as used in the description means that the dielectric layers 9 are formed of all polymeric materials including sheet and fibrous types, although it is possible that other components of the capacitor can be formed of paper or non-polymeric materials, which would also be impregnated with electric dielectric compositions.

According to the invention, the dielectric layers 9 are impregnated with a liquid dielectric composition which consists of low molecular weight polybutene having an average number molecular weight in the range of 300 to 500. The polybutene having a molecular weight in this range has a viscosity at 100° F in the range of 100 to 2000ssu, and has a viscosity at 210° F in the range of 35 to 150 ssu.

In the past, higher molecular weight polybutene having an average number of molecular weight of about 800 to 1400 has been used in the production of cables. However, the polybutene has not been successfully applied to the production of capacitors. In high stress, power factor capacitors, it is desirable to have a reasonably matched system with the dielectric constants of both the solid and liquid dielectrics being similar. Paper has a dielectric constant of about 6.7, while in the case of high molecular weight polybutene, the dielectric constant is about 2.1, and thus no balanced dielectric system can be obtained with paper and polybutene. Utilizing high molecular weight polybutene with a paper dielectric results in poor performance at high stresses due to the fact that the polybutene depolymerizes, resulting in a lowering of the visocisty of the liquid and the eventual formation of gas pockets. The gas pockets ionize under stress and produce corona discharges and dielectric failure. Because of this, the high molecular weight polybutene has been used in combination with all-paper or paper-film systems only in cables which are normally subjected to low stresses.

The higher molecular weight polybutene, as has been used in the past with all-paper or paper-film systems in cables, has not been employed in an all-film system in a capacitor due to the fact that adequate impregnation of the film could not be achieved.

However, in accordance with the invention, it has been found that when using a lower molecular weight polybutene, having an average number molecular weight in the range of 300 to 500, satisfactory impregnation of an all-film solid dielectric can be achieved and the resulting dielectric system has substantially improved dielectric properties over all-film systems impregnated with conventional liquid dielectrics, such as polychlorinated diphenyl.

The polymeric film is impregnated by the polybutene by means of diffusion. When the polybutene contacts the film, polybutene molecules enter the film. Once in the film, the liquid molecules migrate from regions of high concentrations to regions of low concentrations until equilibrium is achieved. It has been recognized that at least 1%, and preferably at least 4%, by weight of the liquid dielectric must penetrate the film to provide adequate impregnation. Using the low molecular weight polybutene in combination with polypropylene film at a temperature of 110° C, it has been found that up to 18% by weight of the polybutene impregnated the film by diffusion. The low molecular weight polybutene will more readily impregnate an all-film system than conventional impregnants. This increase in the rate of impregnation is related to the surface energy of the polybutene and is also dependent at least in part on the relatively low viscosity of the polybutene. An increase in the rate of impregnation can result in a substantial time saving in the processing or fabrication of the capacitor.

The combination of the low molecular weight polybutene with the polymeric film provides corona starting voltage (CSV) comparable to that of a system utilizing trichlorodiphenyl and polymeric film. However, the polybutene-polymeric film system has substantially lower dielectric losses than an all-film system impregnated with a trichlorodiphenyl.

The polybutene is substantially fully biodegradable meaning that if it should be exposed to the environment because of leakage or rupture of the casing, or through discard of obsolete capacitors, the polybutene will decompose into a harmless compound and there will be no significant adverse environmental effect. Thus, no pollution of the environment has been found to exist through use of the polybutene as the liquid dielectric.

The capacitor, as illustrated in the drawings, can be fabricated by standard procedures, in which the casing containing the capacitor pack is initially vacuum dried to remove air and moisture and the liquid dielectric composition is separately dried. The liquid dielectric is then introduced into the capacitor and permitted to soak under vacuum for an extended period in order to completely impregnate the dielectric layers 9 with the liquid dielectric composition. Following this period of soaking, the unit is sealed.

During operation of the electrical apparatus or capacitor, the dielectric system may decompose if subjected for long periods to electrical stress, to elevated temperatures, or to the action of reactive chemical agents. The decomposition products deterously effect the dielectric system and can lead to premature breakdown and failure of the capacitor. In the past, neutralizing agents or scavengers have been used to neutralize the decomposition products, thereby improving the dielectric properties and service life of the capacitor. The scavengers have taken the form of epoxide compounds, such as 1,2,-epoxy-3-phenoxypropaine; bis(3,4-epoxy-6-methylcyclohexylmethyl) adipate; 1-epoxyethyl-3,4-epoxycyclohexane; 3,4-epoxycyclohexylmethyl-3,4-epoxycyclohexanecarboxylate; 3,4-epoxy-6-methylcyclohexylmethyl-3,4,-epoxy-6-methylcyclohexanecarboxylate; and 3,4-epoxy-6-methylcyclohexane oxylate; and mixtures thereof.

In accordance with the invention, the dielectric liquid can include from 0.1 to 10% by weight of a cyclohexylamine which acts to prevent the decomposition of the dielectric or acts as scavenger which reacts with decomposition products to insure greater reliability. The addition of the cyclohexylamine not only produces greater reliability in a capacitor impregnated with polybutene, but results in higher stress capability.

The preferred cyclohexylamine is dicyclohexylamine which is recognized to have the following formula:

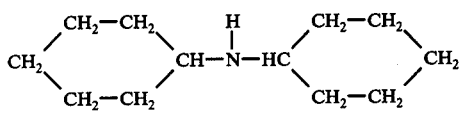

From the above formula it can be seen that dicyclohexylamine has a symmetrical structure which is particularly desirable in that a non-symmetrical structure will create greater electrical losses in the system.

Other cyclohexylamines which can be used are: N-ethylcyclohexylamine; N-isopropylcyclohexylamine; N-(2-hydroxyethyl) cyclohexylamine; N-(2-cyanoethyl) cyclohexylamine; N-(3-aminopropyl) cyclohexylamine; N-cyclohexyl-β-alanine; 2-cyclohexylamino-1-phenylethanol; N,N-dimethylcyclohexylamine; N-phenylcyclohexylamine; N-cyclohexylpiperidine; N-methylcyclohexylamine; N-methyldicyclohexylamine; polyethoxylated cyclohexylamines, abbomeen E-2, E-5, E-10, E-15, E-20, and E-25; N-cyclohexylmorpholine; and N,N' dicyclohexylthiourea, hereinafter referred to in the specification and claims as "Group A."

The liquid dielectric liquid can also include from about 0.3 by weight to 20% by weight of trichlorobenzene which acts to lower the viscosity of the dielectric liquid and also lower the pour point. By lowering the viscosity and pour point, the impregnation of the solid dielectric material is improved.

It is preferred to employ 1,2,4-trichlorobenzene which is liquid at low temperatures, but the other two isomers of trichlorobenzene, which are solid at room temperature, can also be used as the additive, if desired.

In the operation of a capacitor it is important that the dielectric system not be subjected to long periods of corona discharges. Corona discharges are very deterious to the dielectric system and can result in premature breakdown and failure of the capacitor. While a capacitor is designed so as not to operate with the presence of corona discharges, switching surges and the like very often raise the stress on the dielectric into the corona region. When the switching surge has terminated, it is necessary that the corona discharges also extinguish.

To improve the corona discharge characteristics, the dielectric liquid can contain from 0.05 to 15% by weight and preferably from 0.10 to 5% by weight of an antioxidant, such as butylated hydroxytoluene or di-tert-butyl-p-cresol. These materials act to raise the corona extinction voltage and thereby decrease the time that the dielectric system is in corona.

The following examples illustrate the invention:

EXAMPLE 1

A series of small sample capacitors were constructed of two sheets of 0.0005 inch polypropylene film between sheets of aluminum foil. One group of samples was impregnated with polybutene having an average number molecular weight of 330, as the liquid dielectric, while a second group of identical samples was impregnated with trichlorodiphenyl containing 0.5 % by weight of an epoxide additive, bis(3,4-epoxy-6-methylcyclohexylmethyl) adipate.

The following table lists the representative data of the two systems after impregnation, and after operation at 1000 hours at 1200 volts and after 1000 hours of operation at 1500 volts.

TABLE I

| | After Impregnation | | After 1000 Hrs. at 1200 Volts | | After 1000 Hrs. at 1500 Volts | |
|---|---|---|---|---|---|---|
| | CVS in Volts | D.F. in % | CSV in Volts | D.F. in % | CSV in Volts | D.F. in % |
| Trichloro-Diphenyl Plus an Epoxide Additive | 2,370 | .270 | 2,270 | .077 | 2,320 | .060 |
| Polybutene | 2,280 | .021 | 2,110 | .005 | 2,370 | .010 |

From the above Table it can be seen that the corona starting voltages (CSV) for both sets of samples were comparable both after impregnation and after operation at both 1200 volts and 1500 volts for 1000 hours. However, the dielectric losses for the samples impregnated with polybutene were considerably lower than the dielectric losses for the samples impregnated with the trichlorodiphenyl. This data clearly indicates that the samples utilizing polybutene do not deteriorate when under electrical stress, as was recognized in the past when high molecular weight polybutene was utilized with paper in a capacitor construction.

EXAMPLE 2

A series of tests were conducted to show the advantage of incorporating dicyclohexylamine as a scavenger with the polybutene. In this test a series of small capacitor samples were constructed having a dielectric layer of two sheets of 0.0005 inch high density bi-axially oriented polypropylene film impregnated with polybutene. A second series of identical samples were prepared except that the dielectric liquid contained 0.2% by weight of dicyclohexylamine. After 1000 hours of operation at 1800 volts two of the six samples containing only polybutene as the liquid dielectric had failed and a third had a sever increase in dissipation factor. Of the six samples containing the dicyclohexylamine in combination with the polybutene, none of the six samples had failed during the test period and none of the samples showed any deterioration in loss characteristics or corona starting voltages, thereby indicating an increase in stability achieved through the use of the dicyclohexylamine.

EXAMPLE 3

A series of small capacitor samples were constructed of two sheets of 0.0005 polypropylene film between aluminum foil. A group of the samples was impregnated with trichlorodiphenyl containing 0.5% by weight of an epoxide scavenger, bis(3,4-epoxy-6-methylcyclohexylmethyl) adipate, while a second group of samples was impregnated with polybutene having an average number molecular weight of 330, and a third group of samples was impregnated with polybutene containing 15% by weight of trichlorobenzene and 0.075% by weight of an epoxide scavenger, bis(3,4-epoxy-6-methylcyclohexylmethyl) adipate. Each group of samples was tested at −45° C, 0° C, 30° C and 90° C, and the result of the tests are shown in the following table:

TABLE II

| Description | −45° C CSV In Volts | −45° C D.F. in % | 0° C CSV in Volts | 0° C D.F. in % | 30° C CSV in Volts | 30° C D.F. in % | 90° C CSV in Volts | 90° C D.F. in % |
|---|---|---|---|---|---|---|---|---|
| Trichloro-Diphenyl plus an Epoxide Additive | 1,700 | 1.15 | 2,400 | 0.19 | 2,300 | 0.04 | 2,700 | 0.07 |
| Polybutene | 1,800 | .024 | 1,900 | .008 | 2,400 | .012 | 2,200 | .025 |
| Polybutene plus 15% trichlorobenzene | Over 2,500 | .0593 | Over 2,700 | .0082 | 2,700 | .0045 | 2,700 | .0187 |

As noted from the results shown in Table II, the CSV of the samples impregnated with trichlorodiphenyl and polybutene are comparable throughout the entire operating range, although the polybutene samples had considerably lower dielectric losses.

The addition of the trichlorobenzene to the polybutene produced a higher CSV over the entire operating range. The dielectric losses are comparable to those of the samples impregnated with the polybutene alone, but are considerably lower than the samples impregnated with the trichlorodiphenyl.

The above test data indicates that the capacitor samples impregnated with polybutene have a CSV similar to that of a system utilizing chlorinated diphenyl but have substantially lower dielectric losses over the entire operating range, which is of particular importance when the dielectric liquid is to be used in a capacitor.

Furthermore, the liquid dielectric of the invention is biodegradable so that if it is exposed to the atmosphere it will decompose over a period of time, thereby preventing any permanent pollution of the environment.

Various modes of carrying out the invention are contemplated as being within the scope of the following claims particularly pointing out and distinctly claiming the subject matter which is regarded as the invention.

We claim:

1. A dielectric system for use in an electrical apparatus, comprising a layer of polymeric material, and a liquid dielectric impregnated into said polymeric material, said liquid dielectric comprising polybutene having an average number molecular weight in the range of 300 to 500 and containing from 0.01 to 10% by weight of a cyclohexylamine and from 0.05 to 15% by weight of a compound selected from the group consisting of butylated hydroxy toluene and di-tert-butyl-p-cresol.

2. A dielectric system for use in an electrical apparatus, comprising a layer of polymeric material, and a liquid dielectric impregnated into said polymeric material, said liquid dielectric comprising polybutene having an average number molecular weight in the range of 300 to 500 and containing from 0.01 to 10% by weight of a cyclohexylamine, from 0.3 to 20% by weight of trichlorobenzene, and from 0.05 to 15% by weight of a compound selected from the groups consisting of buylated hydroxy toluene and di-tert-butyl-p-cresol.

* * * * *

UNITED STATES PATENT AND TRADEMARK OFFICE
CERTIFICATE OF CORRECTION

PATENT NO. : 4,110,496

DATED : August 29, 1978

INVENTOR(S) : JOHN LAPP and FRED S. SADLER

It is certified that error appears in the above-identified patent and that said Letters Patent are hereby corrected as shown below:

Col. 6, Line 1 (TABLE I)  Under column heading "After Impregnation: Cancel "CVS" and substitute therefor ---CSV---, Col. 6, Line 52, Cancel "sever" and substitute therefor ---severe---, Col. 8, Line 37, CLAIM 2, Cancel "buylated" and substitute therefor ---butylated---

Signed and Sealed this

Tenth Day of April 1979

[SEAL]

Attest:

RUTH C. MASON
Attesting Officer

DONALD W. BANNER
Commissioner of Patents and Trademarks